(12) United States Patent
Brock et al.

(10) Patent No.: US 6,350,862 B1
(45) Date of Patent: Feb. 26, 2002

(54) REACTIVE DYE COMPOUNDS

(75) Inventors: Earl David Brock, West Chester, OH (US); David Malcolm Lewis, West Yorkshire; Taher Iqbal Yousaf, Surrey, both of (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/647,581

(22) PCT Filed: Apr. 1, 1999

(86) PCT No.: PCT/US99/07292

§ 371 Date: Oct. 2, 2000

§ 102(e) Date: Oct. 2, 2000

(87) PCT Pub. No.: WO99/51682

PCT Pub. Date: Oct. 14, 1999

(51) Int. Cl.$^7$ .......................... C09B 62/20; C09B 67/24; D06P 1/382
(52) U.S. Cl. ...................... 534/603; 534/605; 534/612; 8/428; 8/436; 8/437; 8/549; 8/917; 8/918; 8/919; 8/924
(58) Field of Search ................. 534/603, 605, 534/612; 8/428, 436, 437, 549, 917, 918, 919, 924

(56) References Cited

FOREIGN PATENT DOCUMENTS

| | | | |
|---|---|---|---|
| CA | 771632 | 11/1967 | ............ 167/75 |
| DE | 33 35 956 A1 | 4/1985 | ............ C09B/62/20 |
| FR | 1385660 | * 5/1965 | |
| JP | 60-208367 | * 10/1985 | |
| JP | 63-006181 | * 1/1988 | |

OTHER PUBLICATIONS

Okazaki et al., Chemical Abstracts, 61:1976a, 1975.*
Lehr et al., Dyes and Pigments, 14(4), 1990, 239–263.*
Abstract for JP 60–208,367, T. Miyamoto et al., "Dyeing and printing of fibrous materials with pyrimidine compounds," Jun. 30, 1986.
Abstract for JP 63–006,181, T. Shirasaki et al., "One–step one–bath dyeing of cellulosic fiber blends," Aug. 22, 1988.
Lehr, F., "Synthesis and Application of Reactive Dyes withHeterocyclic Reactive Systems," Jan. 19, 1990, pp. 239–263.
Chemical Abstracts, 104:226326, 1986.
Chemical Abstracts, 109:56514, 1988,

* cited by examiner

*Primary Examiner*—Fiona T. Powers
(74) *Attorney, Agent, or Firm*—Stephen T. Murphy; Brent M. Peebles

(57) ABSTRACT

Reactive Dye compound having formula (I) wherein: D is a chromophore group; L is a linking moiety; Q is a quaternized nitrogen derivative; X and Y are independently selected from chlorine, bromine, fluorine or hydrogen; A is selected from halogen, preferably chlorine or fluorine; provided that at least one of X and Y is fluorine; A is selected from halogen, preferably chlorine or fluorine; and salts and esters thereof. The reactive dye compounds of the invention have high Exhaustion Values, high Fixation Values, particularly on cellulosic substrates such as cotton, and show significant improvements in terms of reducing spend dyestuff in effluent, increasing dye affinity to the substrate, increasing the dye-substrate covalent bonding, increasing the ability to dye substrates at room temperature, decreasing the amount of dye that is removed during the post dyeing "soaping off process" and therefor simplying the post dyeing "soaping off process" traditionally associated with dyeing cotton with fiber reactive dyes and reduction of staining of adjacent white fabrics. In addition, the compounds prepared above provide more intense dyeings and require less levels of salt for dyeing cotton substrates.

(I)

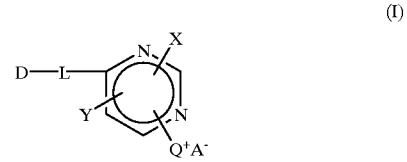

25 Claims, No Drawings

REACTIVE DYE COMPOUNDS

TECHNICAL FIELD

The present invention relates to reactive dye compounds. In particular the present invention relates to reactive dye compounds having improved dye-bath Exhaustion (E) and improved dye-fiber covalent Fixation (F).

BACKGROUND OF THE INVENTION

Reactive dye compounds are known in the art for dyeing various substrates. Such substrates include for example proteinaceous materials such as keratin, e.g. found in hair, skin and nails and various animal body parts such as horns, hooves and feathers, and other naturally occurring protein containing materials, e.g. silk and saccharide-derived materials such as those derived from cellulose or cellulose derivatives, e.g. natural products such as cotton, and synthetic fibers such as polyamides.

Examples of classes of such reactive dyes which are well known in the art include dyes containing a mono- or dichloro- or fluoro- 1,3,5-triazinyl group, mono- or dichloro or fluoro-pyrimidyl group, beta-halogen-propionyl group, beta-halogenoethyl-sulphonyl group, beta-halogenoethylsulphamyl group, chloroacetyl amino, beta-(chloro-methyl)-beta-sulphatoethylsulphamyl group, or a vinyl sulphonyl group.

In the case of the dyes containing a triazinyl group or a pyrimidyl group, in place of the reactive halogen atoms one can use other groups which dissociate in the presence of alkali. Canadian Patent 771632, for example, discloses examples of such other groups including sulphonic acid, thiocyanate, sulphophenoxy, sulphophenyl thio, nitrosulphophenoxy groups, and quaternary ammonium groups.

Dyes and Pigments 14, 1990, pages 239–263, "Synthesis and Application of Reactive Dyes with Heterocyclic Reactive Systems" discloses fiber reactive dyes containing monochloro- or dichloro- pyrimidine heterocycle with quaternary ammonium substituents.

There are many different types of commercially-available reactive dyes for dyeing cellulosic and polyamide-type substrates. However, a critical problem still facing the textile dye industry today is the significant level of dyestuff material which remains in the effluent waste water after the dyeing process is finished. The industry measure for this problem is known as dye-bath Exhaustion (E). A high Exhaustion value for a particular dye compound means that a low level of spent dye remains in the effluent after the dyeing process is complete, while a low Exhaustion value means that a high level of spent dye remains in the effluent. There is clearly a need therefore for new dye compounds which have higher Exhaustion Values compared with commercially available dye compounds, and which provide benefits in terms of reducing levels of spent dyestuff in effluent water.

As well as having a high Exhaustion Value, it is also important for a dye compound to have a high dye-fiber covalent Fixation Value (F). The Fixation Value (F) of a dye compound is a measure of the dye affinity at the substrate surface or in other words the percentage of dye removed from the substrate by the so-called post-dyeing "soaping off process", based on the dye originally absorbed during the dyeing process. Thus there if clearly a need to provide dye compounds having increased Fixation Values. A high Fixation Value can result in a simplification of the post dyeing "soaping off process" traditionally associated with fiber reactive dye compounds. In particular, a high Fixation Value can result in a reduced time spent on the "soaping off process" together with a reduced cost.

It has now been surprisingly found that a new class of fiber reactive dye compounds comprising a monofluoropyrimidine heterocycle or a monochloromonofluoro pyrimidine heterocycle substituted with at least one quaternized nitrogen derivative such as nicotinate, exhibit significantly increased values of Exhaustion (E) and Fixation (F), particularly on cellulosic substrates such as cotton, and show significant improvements in terms of reducing spent dyestuff in effluent, increasing dye affinity to the substrate, increasing the efficiency of the dye-substrate covalent reaction, and simplifying the post dyeing "soaping off process" traditionally associated with fiber reactive dyes. In addition, the compounds of the present invention provide significantly more intense dyeings, and can be used for both high and low temperature dyeing. Furthermore, the compounds of the present invention can be used together with specific chromophores for cotton dyeing using significantly reduced levels of salt needed for dyeing.

SUMMARY OF THE INVENTION

According to the present invention there is provided a reactive dye compound having the formula (I):

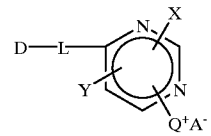

wherein:
  D is a chromophore group;
  L is a linking moiety;
  Q is a quaternized nitrogen derivative;
  X and Y are independently selected from chlorine, bromine, fluorine or hydrogen;
  A is selected from halogen, preferably chlorine or fluorine;
  provided that at least one of X and Y is fluorine and salts and esters thereof The compounds of the present invention exhibit increased Exhaustion (E) and Fixation (F) values and provide improvements in terms of reducing spent dyestuff in effluent, increasing dye affinity to the substrate, and simplifying the post dyeing "soaping off process" traditionally associated with fiber reactive dyes. In addition, the compounds of the present invention provide significantly more intense dyeings.

DETAILED DESCRIPTION OF THE INVENTION

As used herein the term "reactive dye" means a dye containing a one or more reactive groups, that is to say one or more groups capable of forming covalent bonds with the substrate to be dyed, or a dye which forms such a group in situ.

As used herein the term "Exhaustion" in relation to fiber reactive dyes means the percentage of dye which is transferred from a solution of the dye to the substrate to be treated at the end of the dyeing process, before rinsing and soaping. Thus 100% Exhaustion means that 100% of the dye is transferred from the dye solution to the substrate.

As used herein the term "Fixation" in relation to reactive dyes means the percentage of dye which covalently bonds with the substrate, based on the dye originally absorbed during the dyeing process. Thus 100% Fixation means that 100% of the dye absorbed is covalently bonded with the substrate.

Reactive dye compounds of the present invention may be represented by the following formula (I):

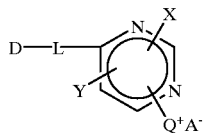

wherein:

D is a chromophore group;

L is a linking moiety;

X and Y are independently selected from chlorine, bromine, fluorine or H;

A is a halogen preferably chlorine or fluorine.

provided that at least one of X and Y is fluorine.

Chromophore Moiety

Any chromophore moieties suitable for use for dyeing substrates can be used in the present invention.

Any chromophore moieties suitable for use for dying substrates can be used in the present invention. The term chromophore as used herein means any photoactive compound and includes any colored or non-colored light absorbing species, eg. fluorescent brighteners, UV absorbers, IR absorbing dyes.

Suitable chromophore moieties for use in the dye compounds herein include the radicals of monoazo, disazo or polyazo dyes or of heavy metal complex azo dye derived therefrom or of an anthraquinone, phthalocyanine, formazan, azomethine, dioxazine, phenazine, stilbene, triphenylmethane, xanthene, thioxanthene, nitroaryl, naphthoquinone, pyrenequinone or perylenetetracarbimide dye.

Suitable chromophore moieties for use in the dye compounds herein include those disclosed in EP-A-0,735,107 (Ciba-Geigy), incorporated herein by reference, including the radicals described therein which contain substituents customary for organic dyes, such as sulphonate substituents which enhance the water-soluble properties of the dye compound Most preferred chromophore D groups for use herein are polysulphonated azo chromophores such as those present Drimalan (RTM) dyes commercially available from Clariant and Drimarene (RTM) dyes commercially available from Clariant.

Linking Moiety

The compounds herein further comprise a linking moiety to link the pyrimidine heterocycle to the chromophore moiety. Any linking moieties suitable for use in dyeing substrates can be used in the present invention. Preferably the linking moiety is selected from NR, NRC=O, C(O)NR, NRSO₂ and —SO₂NR wherein R is H or C₁–C₄ alkyl which can be substituted by halogen, preferably fluorine or chlorine, hydroxyl, cyano, $C_1$–$C_4$ alkoxy, $C_2$–$C_5$ alkoxycarbonyl, carboxyl, sulfamoyl, sulfo or sulfato. A preferred linking moiety is NR, preferably where R is H or $CH_3$, especially H.

Suitable quaternized nitrogen derivatives for use herein can be represented by Q+ wherein Q is selected from amines, saturated or unsaturated, substituted or unsubstituted nitrogen containing heterocycles having from about 3 to about 8 ring members and comprising at least one nitrogen heteroatom. Preferred substituents are carboxylates, amides, C1–C4 alkyl and alkyl carboxylates.

Particularly preferred for use herein are Q groups selected from:

NR"₃,

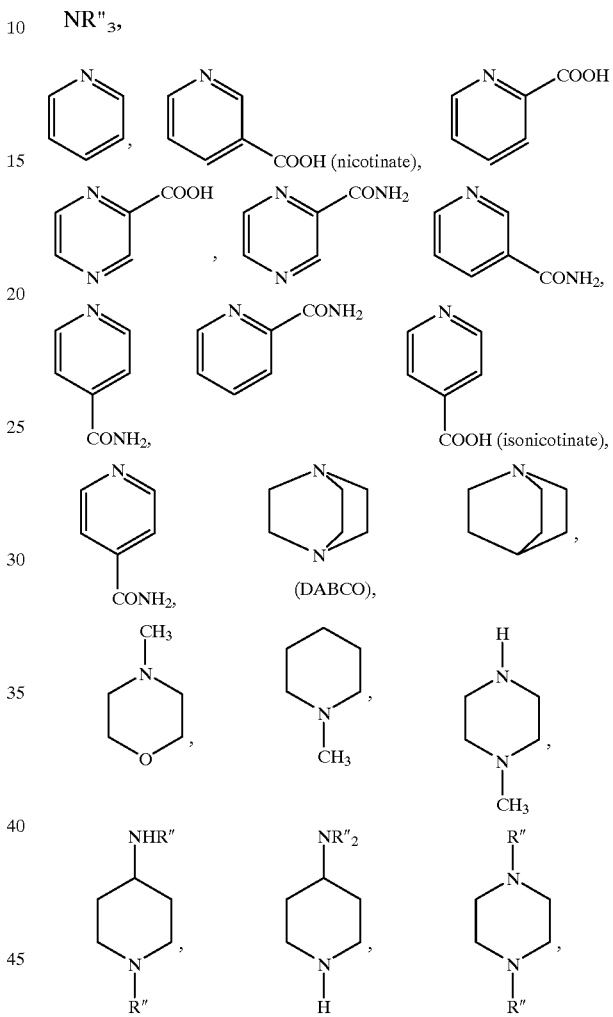

$(CH_3)_2N-NH_2$;

$N(CH_3)_2CH_2COOH$ (dimethylaminobetaine);

$N(CH_3)_2(CH_2)_nNH_2$ $N(CH_3)_2(CH_2)_nN^+R"_3$;

$N(CH_3)_2CH_2CONH_2$;

wherein R" is $C_1$–$C_4$ alkyl and n is an integer of from 1 to 4

Particularly preferred quaternized nitrogen derivatives for use herein are nicotinate, diazabicyclooctane (DABCO), dimethylaminobetaine and isonicotinate, especially nicotinate.

The quaternized nitrogen derivative is attached to the nitrogen-containing heterocycle via its tertiary nitrogen atom.

X and Y are substituents on the pyrimidine ring and are independently selected from fluorine, chlorine, bromine or hydrogen. However, at least one of X and Y must be fluorine. In preferred embodiments, X is selected from chlorine or hydrogen, especially chlorine and Y is fluorine.

In the above general formula (I), the X, Y and Q+A– groups can be attached to any of the three available ring carbon atoms. However, in particularly preferred embodiments, the compounds herein have the formula (II) below:

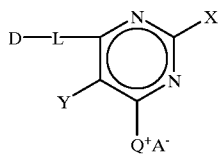

where D, L, Y, X, Q and A are as defined above, and wherein X, Y and Q+A– are attached to defined positions on the ring as shown, which compounds can be prepared from commercially available starting materials such as Drimalan (RTM) and Drimarene (RTM) dyes from Clariant.

The present invention furthermore relates to processes for the preparation of dyes having the formula (I) and (II) above. In general, these dyes can be prepared by reacting suitable precursors of the dye of formula (I) or (II) with one another, at least one of which contains a group D-L-pyrimidine, wherein D, and L are as defined above, and at least one of which contains a Q group (wherein Q is as defined above).

Dye compounds of the invention having a formula (I) or (II) wherein X is fluorine and Y is chlorine can be prepared by reacting a difluoromonochloro pyrimidine dye such as those commercially available from Clariant under the tradenames Drimalan (RTM) and Drimarene (RTM), with a suitable reactant containing a Q group.

The reactions of the starting dye compounds with the reactant containing a Q group are generally carried out at a pH of from about 5 to about 6, and at a temperature of about 40–45 C.

The dye compounds herein are suitable for dyeing and printing a wide variety of substrates, such as silk, leather, wool, polyamide fibers and polyurethanes, keratin fibers such as hair, and in particular cellulosic materials, such as the natural cellulose fibers, cotton, linen, hemp and the like, paper, and also cellulose itself and regenerated cellulose, and hydroxyl-containing fibers contained in blend fabrics, for example blends of cotton with polyester or polyamide fibers.

The dye compounds of the present invention can be applied and fixed to the substrate in various ways, in particular in the form of aqueous dye solutions and printing pastes. Thus according to the present invention there is provided a dye composition comprising one or more of the dye compounds described herein together with any carrier material suitable for use in a dye composition.

Preferred dye compositions herein comprise an acidic buffer material. Any acidic buffer suitable for use in dye compositions can be used herein. An example of a suitable buffer is a mixed phosphate buffer.

When the dye composition herein is in the form of a paste a preferred ingredient is a thickening agent. Any suitable thickening agents suitable for use in dye compositions can be used herein.

When the dye composition is in the form of an aqueous solution or aqueous gel/paste, the dye composition preferably has a pH of about 5 or less, preferably from about 2 to about 3.

When the dye composition is being used for dyeing hair, the composition can comprise one or more of the compounds described herein either alone or in admixture with other well known hair dye compounds such as oxidative dyes, direct dyes, and the like.

The dyeing and printing processes which can be used with the dyes herein are conventional processes which are well known and which have been widely described in the technical and patent literature. The dye compounds herein are suitable for dyeing both by the exhaust method and also by the pad-dyeing method, whereby the goods are impregnated with aqueous, salt-containing or salt-free dye solutions and the dye is fixed after an alkali treatment or in the presence of alkali, if appropriate with the application of heat. The dye compounds herein are also suitable for the cold pad-batch method, after which the dye together with the alkali is applied to the pad-mangle and then fixed by several hours of storage at room temperature. After fixing, the dyeings or prints are thoroughly rinsed with cold and hot water, if appropriate with the addition of an agent acting as a dispersant and promoting the diffusion of the non-fixed portions.

Thus in accordance with another aspect of the present invention there is provided a use of the reactive dyes of the present invention for dyeing and printing substrates such as cellulosic substrates such as cotton, wool, polyamides such as nylon, polyesters, polyurethanes, silk, keratin such as hair, leather, paper, and the like. The compounds herein can be used in methods of dyeing all of the substrates listed above by applying an aqueous solution of one or more of the reactive dyes of the present invention to the substrate to be dyed under suitable conditions of pH and temperature.

The following examples serve to illustrate the compounds of the present invention.

The starting compounds and components given in the examples below can be used in the form of the free acid or in the form of their salts.

EXAMPLES

Example 1

The 5-chloro-4-nicotinyl-2-fluoro pyrimidine dye is prepared using the synthesis route as illustrated in Diagram 1.

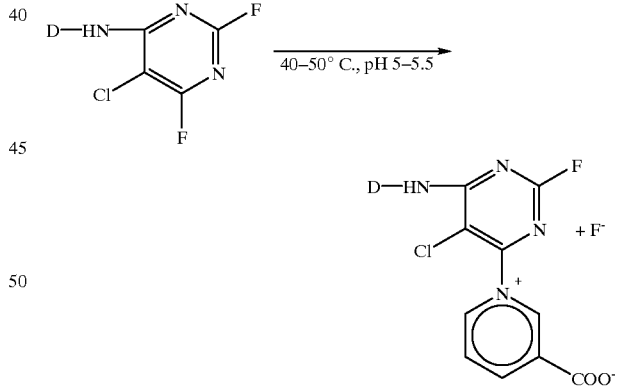

Diagram 1

In the reaction scheme D is a chromophore and varies depending on which starting dye is used. In the present example Drimarene Brill Red 4-KBL is used as the starting material. However any suitable pyrimidine containing dye can be used as a starting material including any Drimalan F dye, any Drimarene R dye and any Drimarene K dye commercially available from Clariant.

Synthesis of 5-chloro-4-nicotinyl-2-fluoro Pyrimidine Dye 0.1 moles of pure Drimarene Brill Red K-4BL dye and 150 ml of distilled water is introduced into a flask. 0.1 moles of nicotinic acid is then added dropwise to the reaction mixture under stirring, from a dripping funnel. The total addition time is 1–1.5 hours. The pH of the reaction system is maintained at pH 5–5.5 and the temperature of the reaction system 40–45° C., throughout the addition of nicotinic acid.

The reaction is then allowed to proceed at 40–45° C. and pH5–5.5 (which is corrected using sodium carbonate and HCl) for 3–4 hours. The end-of-reaction point for this part of the synthesis is indicated by the pH of the reaction system remaining constant for more than 5 minutes. At this point, the 5-chloro-4-nicotinyl-2-fluoro pyrimidine dye is obtained. Using 6N HCl, the pH of the system is then reduced to below pH 2 to terminate the reaction. KCl (≅35% of the total solution) is then added to the reaction mixture in order to precipitate the dye, Filtration using Whatman filter paper follows. The precipitate is then washed with acetone 4–5 time (≅50 ml of acetone was used each time) to obtain the 5-chloro-4-nicotinyl-2-fluoro pyrimidine dye.

The compounds prepared above have high Exhaustion Values, high Fixation Values, particularly on cellulosic substrates such as cotton, and show significant improvements in terms of reducing spent dyestuff in effluent, increasing dye affinity to the substrate, increasing the dye-substrate covalent bonding, increasing the ability to dye substrates at room temperature, decreasing the amount of dye that is removed during the post dyeing "soaping off process" and therefore simplying the post dyeing "soaping off process" traditionally associated with dyeing cotton with fiber reactive dyes and reduction of staining of adjacent white fabrics. In addition, the compounds prepared above provide more intense dyeings and require less levels of salt for dyeing cotton substrates.

Example 2

All dye compounds prepared according to Example 1 above can be used to dye cotton using the dyeing procedures detailed below. After the cotton dyeing procedure has been carried out a soaping-off process can also be carried out on the cotton fiber.

Cotton Dyeing Procedure

An aqueous dye solution is prepared containing a dye compound according to Example 1. The dye solution contains 1.2% on mass of fiber of dye, 80 g/L $Na_2SO_4$ and 5% on mass of fiber of sodium acetate. The cotton fabrics are soaked in water and then the cotton fabrics are dyed in the above dye-bath at pH 7 at 25° C. for 30 minutes. The dyed cotton fabric is then fixed in the dye-bath at pH 11.5 with addition of 30 g/L of sodium formate and 5 g/L $Na_2CO_3$ and dyeing continued at 25° C. for 30 minutes. The dyed fabric is rinsed with water.

In the above dyeing procedure the dye bath for each dye compound is almost totally exhausted, indicating that the compounds prepared according to Example 1 each have a high Exhaustion Value.

Soaping-off Process

A soaping off process can then be carried out by washing the dyed fabrics with an aqueous solution of Sandozine NIE (2 g/L) at 100° C. for 30 minutes.

In the above soaping-off process hardly any color was removed from the fabric indicating that the compounds prepared according to Example 1 each have a high degree of dye-fiber covalent bonding and a high Fixation Value.

Co3 (International Standards Organisation) Wash Fastness Test

The dyed fabrics are washed with an aqueous solution containing ECE Reference Detergent (5 g/ml) and sodium carbonate (2 g/ml) at 60° C. for 30 minutes.

In the above wash fastness test, no noticeable color was removed from the cotton fiber and no staining of the white adjacent fibers occurred (using Multiple Fiber adjacent strip supplied by SDC Bradford).

Example 3

All dye compounds prepared according to Example 1 can be used to dye nylon or wool using the dyeing procedures detailed below. After the nylon/wool dyeing procedure has been carried out a wash-test procedure can be carried out on the dyed fabric to test the wash-fastness of the dye compounds.

Wool/Nylon Dyeing Procedure

The wool/nylon fabric is soaked in a 2% Alcopol-O (40% w/w sodium-d-isooctylsulphate succinate -commercially available from Allied Colloids) solution. The fabric is then dyed for 1 hour at 100° C. and pH 3.5 in a dye-bath containing the following compositions: 1.2% on mass of fiber of dye prepared according to any of Examples 1 to 14, 5% on mass of fiber of sodium acetate, 1% Albegal B (commercially available from Ciba Geigy). The dyed wool/nylon fabric was then rinsed with water.

In the above procedure intense dyeings are provided for each of the compounds prepared according to Example 1.

Co2 (ISO) Wash Fastness Test Procedure for Wool/Nylon Fabrics

The dyed wool/nylon fabric is washed in an aqueous solution containing 5 g/L of ECE Reference Detergent (commercially available from Society of Dyers and Colorists, Bradford, UK) at 50° C. for 45 minutes.

In the above wash fastness test, no noticeable color was removed from the wool fibre and no staining of the white adjacent fibers occurred ((using Multiple Fibre adjacent strip supplied by SDC Bradford).

What is claimed is:

1. A dye composition comprising a reactive dye compound and an acid buffer, wherein the reactive dye compound is of the formula (I):

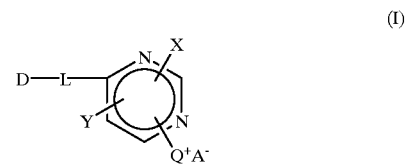

wherein D is a chromophore group; L is a linking moiety; Q is a quaternized nitrogen derivative; X and Y are independently selected from the group consisting of chlorine, bromine, fluorine and hydrogen, provided that at least one of X and Y is fluorine; and A is halogen; or a salt or ester thereof.

2. A dye composition according to claim 1, wherein the reactive dye compound has the formula (II):

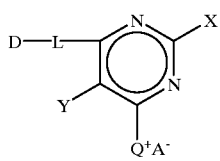

(II)

wherein Q, A, D, L, Y and X are as defined in claim 1.

3. A dye composition according to claim 1, wherein Q is a radical derived from:
NR"3,

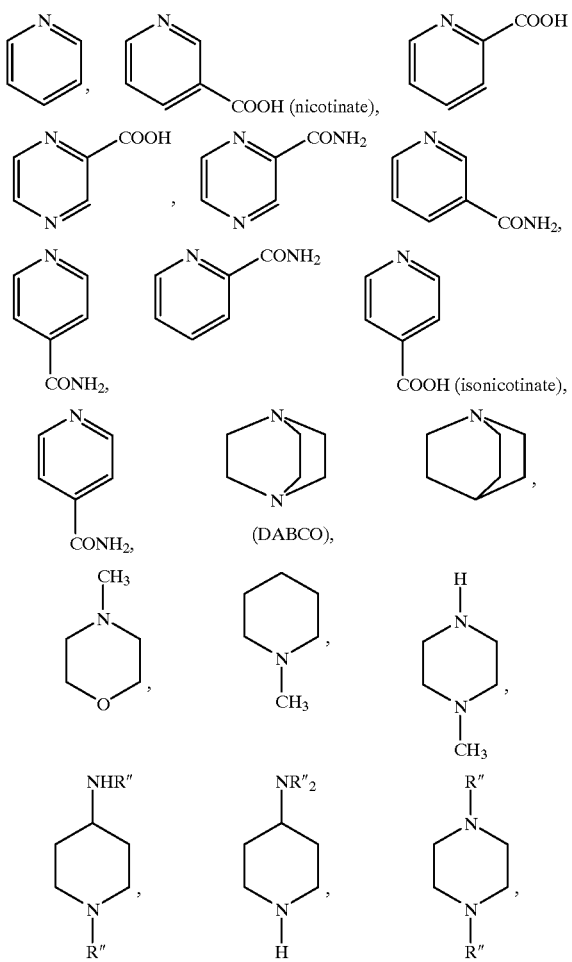

$(CH_3)_2N$—$NH_2$; $N(CH_3)_2CH_2COOH$ (dimethylaminobetaine); $N(CH_3)_2(CH_2)_nNH_2$; $N(CH_3)_2(CH_2)_nN^+R''_3$; or $N(CH_3)_2CH_2CNH_2$;
wherein R" is $C_1$–$C_4$ alkyl and n is an integer of from 1 to 4.

4. A dye composition according to claim 1, wherein Q is selected from the group consisting of nicotinate, isonicotinate, DABCO, and dimethylaminobetaine.

5. A dye composition according to claim 1, wherein Q is nicotinate.

6. A dye composition according to claim 1, wherein X is chlorine or hydrogen.

7. A dye composition according to claim 6, wherein X is chlorine.

8. A dye composition according to claim 1, wherein the linking moiety L is selected from the group consisting of NR, NRC=O and $NRSO_2$ wherein R is H or C1–C4 alkyl, optionally substituted by halogen, hydroxyl, cyano, C1–C4 alkoxy, C2–C5 alkoxycarbonyl, carboxyl, sulfamoyl, sulfo or sulfato.

9. A dye composition according to claim 8, wherein the linking moiety L is NR.

10. A dye composition according to claim 9, wherein R is C1–C4 alkyl or H.

11. A dye composition according to claim 10, wherein R is H.

12. A dye composition according to claim 1, wherein the composition is in the form of a solid mixture.

13. A dye composition according to claim 1, wherein the composition is in the form of a liquid and further comprises water.

14. A dye composition according to claim 1, wherein the composition is in the form of a paste and further comprises water and thickening agent.

15. A dye composition according to claim 1, wherein the composition has a pH of about 5 or less.

16. A dye composition according to claim 15, wherein the composition has a pH of about 2 to about 4.

17. A dye composition according to claim 16, wherein the composition has a pH of about 2 to about 3.

18. A method for reducing spent dyestuff in effluent from a process for dyeing or printing a substrate, comprising contacting the substrate with the dye composition of claim 1.

19. A method according to claim 18, wherein the substrate comprises a cellulosic substrate.

20. A method according to claim 18, wherein the substrate comprises cotton, wool or silk.

21. A method according to claim 18, wherein the substrate comprises nylon.

22. A method according to claim 18, wherein the substrate comprises hair.

23. A method according to claim 18, wherein the substrate comprises leather or paper.

24. A reactive dye compound having the formula (III):

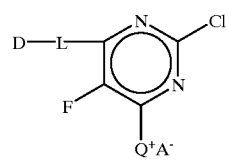

(III)

wherein D is a chromophore group; L is a linking moiety; Q is a quaternized nitrogen derivative; and A is halogen; or a salt or ester thereof.

25. A reactive dye compound according to claim 24, wherein Q is a radical derived from:
NR''₃;
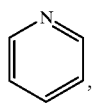 , 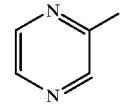 COOH (nicotinate),  COOH,
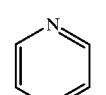 , 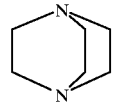 , 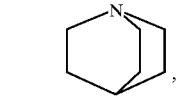 CONH₂,
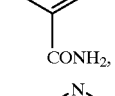 CONH₂, 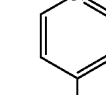 CONH₂, 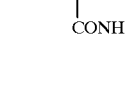 COOH (isonicotinate),
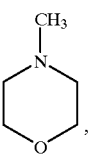 CONH₂, 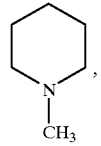 (DABCO), 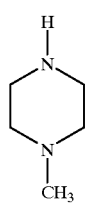 ,
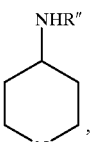 , 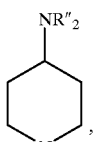 , 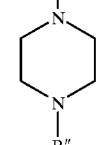 ,
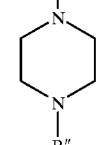 , (piperidine N-methyl), (piperazine);
(CH₃)₂N—NH₂; N(CH₃)₂CH₂COOH (dimethylaminobetaine); N(CH₃)₂(CH₂)ₙNH₂; N(CH₃)₂(CH₂)ₙN⁺R''₃; or N(CH₃)₂CH₂CNH₂;
wherein R'' is C₁–C₄ alkyl and n is an integer of from 1 to 4.
\* \* \* \* \*